Sept. 24, 1963 F. V. GRAMENZI 3,104,614
CONTROL DEVICE FOR PUMP
Filed Jan. 26, 1962 2 Sheets-Sheet 1
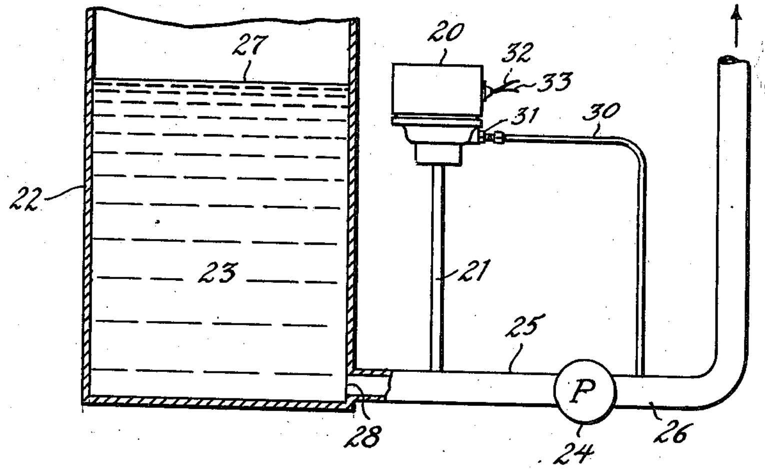
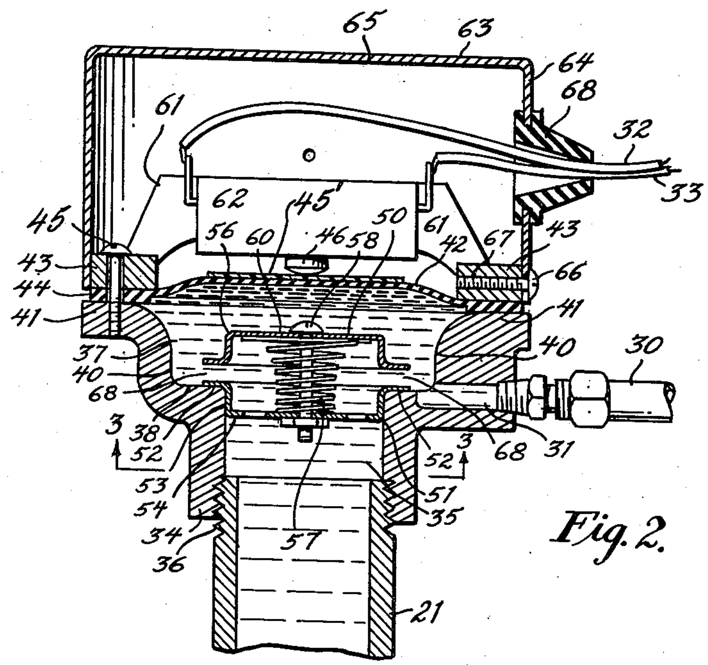
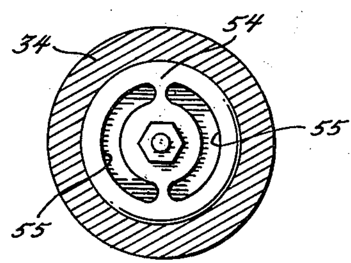
INVENTOR
FRANK V. GRAMENZI
BY
ATTORNEYS Sept. 24, 1963 F. V. GRAMENZI 3,104,614

CONTROL DEVICE FOR PUMP

Filed Jan. 26, 1962 2 Sheets-Sheet 2

INVENTOR
FRANK V. GRAMENZI
BY
ATTORNEYS

United States Patent Office 3,104,614

Patented Sept. 24, 1963

3,104,614
CONTROL DEVICE FOR PUMP

Frank V. Gramenzi, 322 Line St., Camden, N.J.

Filed Jan. 26, 1962, Ser. No. 168,960
4 Claims. (Cl. 103—25)

The device of the invention pertains to controls for pumps and more particularly to a control for a sump pump which is pumping liquid from an enclosure.

A purpose of the invention is to start a pump when the level of the liquid rises to a predetermined level in an enclosure and then continue the pump until the level of the liquid falls below the pump suction level in the enclosure.

A further purpose is to start the pump at a predetermined liquid level and to keep the pump running as long as there is liquid pressure at the discharge of the pump.

A further purpose is to eliminate float valves in the control of a sump pump.

A further purpose is to flex a diaphragm under the pressure created by the rise in liquid level in a sump and then to keep the diaphragm flexed by liquid under pressure from the pump discharge.

A further purpose is to stop the pump when the pump stops discharging a liquid and begins discharging a gas.

A further purpose is to position a valve in the inlet to a chamber adjacent to the flexible diaphragm from the sump which will permit flow of liquid into the chamber but which will prevent flow of liquid from the chamber when the liquid pressure in the chamber is above a predetermined pressure.

A further purpose is to utilize one chamber adjacent to a flexible diaphragm which is adapted to receive a rising water level from a source and also a pump discharge pressure wherein the chamber first receives the pressure from the rising water level to flex the diaphragm and then receives the discharge pressure from the pump to hold the diaphragm flexed.

A further purpose is to use a valve which permits a rising water pressure to flow into a chamber and then prevents the liquid in the chamber from flowing out through the rising water inlet when pressure is applied to the chamber from the sump pump discharge.

A further purpose is to combine electrical switch means with the flexible diaphragm to close an electrical circuit to a motor driven pump.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

FIGURE 1 is a diagrammatic sketch of a system employing the control device of the invention.

FIGURE 2 is a vertical sectional elevation of the control device showing the sump full and the valve open.

FIGURE 3 is a partial section taken on line 3—3 of FIGURE 2.

Figure 4:
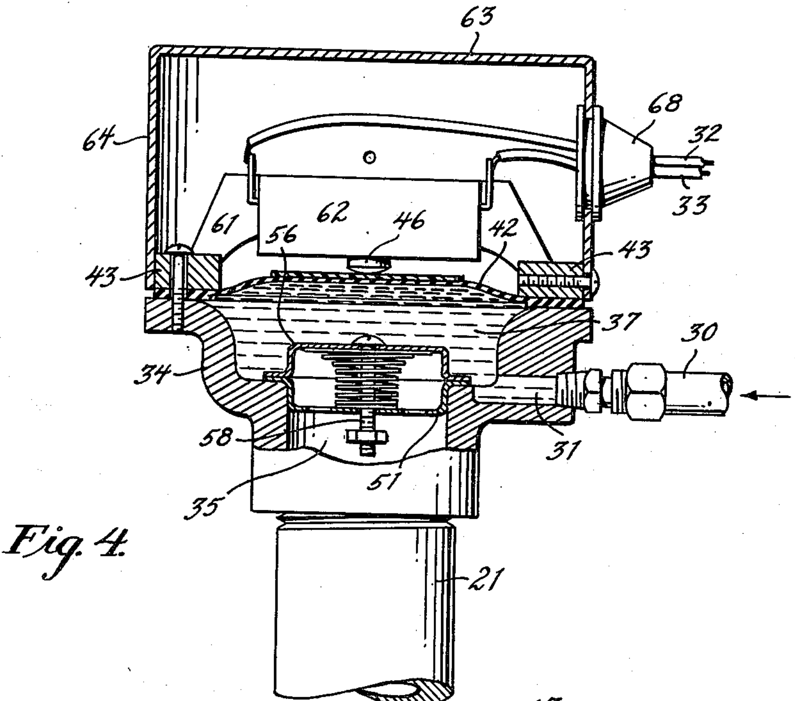
FIGURE 4 is a vertical sectional elevation similar to FIGURE 2 showing the chamber full of liquid under pressure from the pump discharge.
Figure 5:
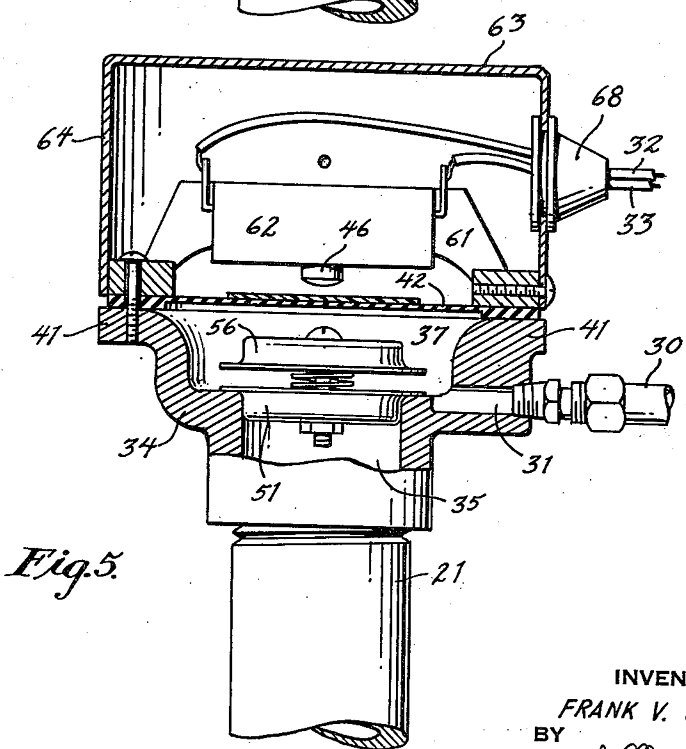
FIGURE 5 is a fragmentary vertical sectional elevation showing the chamber empty of liquid and the valve open.

Describing in illustration but not in limitation and referring to the drawings:

In many applications in the pumping of liquids it is desirable to start the pumping operation when the liquid level in a sump or the like reaches a certain height and to continue the pump in operation until the liquid falls to a certain predetermined lower level. One prior art means of accomplishing this pump control is to use a float which rides on the surface of the liquid and which is mechanically connected to a switch which turns the pump on and off. This method requires numerous moving parts which become rusted, jammed and frequently leaky. The pump either fails to go on or once on is not stopped so that much damage may result. Furthermore, the level differential between the high level and low level position is limited by the mechanical connections to the float.

Other means for controlling the pump have been utilized wherein the rising water level in a container causes a diaphragm to flex which in turn makes a switch contact to start the motor of a pump. The pump under these conditions is continuously stopping and starting since the diaphragm only flexes through a small dimension laterally and it is this dimension which controls the pump action through the electrical switch.

Efforts have been made to utilize the discharge pressure of the pump to keep the pump operating until there is no longer liquid at the pump suction, by utilizing the pump discharge pressure, as for instance shown in Bernhardt U.S. Patent No. 2,488,506. These devices have been extremely complex wherein a plurality of chambers have been used to sustain the various pressures.

In the present invention a single chamber having an inlet from the sump and an inlet from the pump discharge is subjected first to the pressure from the rising water level and then from the pump discharge whereupon valve means close the inlet from the sump. When the pump no longer receives liquid at the suction and hence is not discharging liquid at the discharge, the pressure in the discharge falls causing the valve in the inlet from the sump to open, thus releasing all pressure and liquid from the chamber whereupon the original position of the diaphragm is restored and the electrical switch breaks the circuit to the pump.

Referring to the drawings, FIGURE 1 shows a control device in a system. It should be understood that the arrangement shown is by way of illustration only and not by way of limitation since any of numerous arrangements can be used to incorporate the control device of the invention into a pump system.

Control device 20 has an inlet 21 connected to a sump or container 22 carrying liquid 23. The system is arranged to turn a pump 24 having a suction 25 and a discharge 26 on and off.

When the liquid level in sump 22 reaches location 27 the pump is turned on and when the liquid level in sump 22 reaches point 28 the pump is turned off. A connecting line 30 is connected to pump discharge 26 and chamber inlet 31. Electrical conductors 32 and 33 (partially shown in FIGURE 1) connect with the pump motor from the control device 20.

Referring to FIGURE 2, the control device will be in the position shown when the water level shown in the system of FIGURE 1 is at its turn-on point 27. The inlet line 21 connects to the control housing 34 having an inlet 35. The inlet 21 may be connected to the housing 34 by screw threads 36 as shown or by welding, soldering or the like. The inlet 35 joins a chamber 37 having shoulders 38 and sides 40 which flair into a flange portion 41.

Also leading into chamber 37 is inlet 31 which receives connecting line 30 from the pump discharge. A flexible diaphragm composed of rubber or the like is stretched across the chamber 37 and secured to the flanges 41 by a suitable retaining ring 43. A thicker portion 44 can be suitably constructed integral with the diaphragm 42 to provide a stronger bearing surface, or a rubber gasket or the like may be placed between the diaphragm and the flange to provide a secure joint. The retaining ring 43 is held by bolts 45 which are set into tap holes in the flange 41. A substantially rigid bearing plate 45′ is joined to diaphragm 42 at the center of the diaphragm to provide a surface to bear against switch button 46.

The valve 50 is positioned in the inlet 35 where the inlet 35 joins chamber 37. The valve has a lower section 51 which is stationary with respect to the housing 34 and which is suitably force-fitted into the housing at the walls of the inlet 35. Lower section 51 has an outwardly directed flange 52 which bears against the shoulder 38 and an annular wall 53 which fits against the walls of the inlet 35. A disc portion 54 having curved slots 55 stretches across the inlet 35.

An upper valve section 56 is similar to the lower valve section 51 but has no slots 55. A helical compression spring 57 separates the sections 51 and 56 which are slidably connected together by bolt and nut 58 which extends slidably through a hole in the center of the lower portion 54. The bolthead 58 is fixed to the upper valve section at 60.

Spider arms 61 extend from retaining ring 43 and are suitably integral therewith. An electrical switch 62 having a push button 46 is positioned over diaphragm 42 whereby push button 46 is generally at the center of bearing plate 45′. The electrical switch is connected to the spider arms by screws or other suitable means. The switch 62 is of the conventional type which makes an electrical circuit when the button is pushed in against a spring bias and wherein a circuit is broken when the push button moves outwardly under a spring bias. Suitable electrical leads 32 and 33 are connected to switch 62 and form the circuit to the electrical motor which is made and broken by switch 62. The electrical connections and supply to the pump motor are of any conventional and suitable type and are not shown herein. A cover plate having cylindrical sides 64 and a flat top 65 is joined to retaining ring 43 by bolts 66 screwed in tap holes 67 in the retaining ring. A rubber bushing 68 provides cushion means for carrying leads 32 and 33 through the cover plate.

It will be understood that the valve 50, inlet 35, housing 34, diaphragm 42, retaining ring 43 and cover 63 are suitably of circular form in horizontal section and that the switch 62 may be of any suitable type.

In operation, when the liquid is below level 28, the pump 24 is off and no liquid is being drawn from sump 22 through suction 25 to discharge 26. The liquid 23 in sump 22 rises until the liquid level reaches level 27. This level 27 is determined by the elevation at which the diaphragm 42 is placed. The control device of the invention is desirably positioned with respect to the liquid in the sump so that the diaphragm 42 in an unflexed position lies in a plane parallel to or in the plane of the level of the liquid 23. The level of the diaphragm 42 in the unflexed position will effectively determine the liquid level at which pumping is started.

As the level of the liquid 23 rises in sump 22 it also rises in inlet 21 since there is a liquid connection between the inlet 21 and the sump 22. The valve 50 is open, the upper portion 56 being biased away from the lower portion 54 by spring 57. Hence, the liquid is free to rise in inlet line 21 and pass through inlet 35, through slots 55 in disc 54, through the valve opening at 68 into chamber 37. The rising liquid then forces the diaphragm 42 upward causing bearing plate 45′ to force push button 46 of switch 62 inwardly closing the circuit through conductors 32 and 33 to the motor of pump 24 turning the pump 24 on.

Pump 24 draws fluid through suction 25 from sump 22 and forces the liquid at increased pressure out discharge pipe 26. This discharge pressure at 26 is transmitted through inlet line 30 to inlet 31 through housing 34 into chamber 37. Since this discharge pressure at 26 must be greater than the static head resulting from liquid level 27 in order to pump the liquid, the pressure at inlet 31 becomes greater than the pressure at inlet 35 and the liquid in chamber 37 has a tendency to flow out inlet 35. This tendency to flow out inlet 35 overcomes the spring bias of helical spring 57 and upper valve section 56 is forced over lower valve section 52, sealing off flow through inlet 35 and inlet line 21. It will be evident that the suction of the pump is connected through inlet 21 to the lower portion of valve 50 and tends to maintain a differential pressure to close the valve.

The liquid in chamber 37 is then trapped and transmits the pressure at inlet 31 from the pump discharged to all parts of the fluid in chamber 37. This keeps diaphragm 42 flexed with bearing plate 45′ against push button 46 of switch 62, keeping the circuit closed and electrical energy flowing to the motor of pump 24. The pump 24 continues to pump and the liquid level of fluid 23 continues to fall until the level 28 is reached. At this point the pump 24 looses the fluid in suction line 25 and no more fluid is being pumped through the pump. The liquid 23 is suitably open to the atmosphere. Since no more fluid is passing into the suction of pump 24, the fluid cannot be pumped out at 26 and a fluid pressure maintained, so that the pressure drops to atmospheric at 26. This pressure drop is carried through line 30 to inlet 31 and the fluid in 37 is relieved through line 31 or through line 21 after the valve 50 opens. The valve 50 opens under the bias of spring 57 when the liquid in chamber 37 is no longer subjected to the discharge pressure of the fluid.

The cycle is now ready to repeat itself when the liquid in sump 22 rises to the level of 27.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a pumping system having a sump, a pump, a suction connection from the pump to the sump, a discharge from the pump, and means for actuating said pump, a pressure operated switch for controlling said actuating means comprising a housing, a chamber in the housing, a flexible diaphragm sealing one side of the chamber, electrical switch means in contact with the diaphragm, a first inlet to the chamber from the sump, a second inlet to the chamber from the pump discharge, and valve means in the first inlet to permit fluid from the sump to enter the chamber and prevent fluid from the pump discharge to leave the chamber, whereby pressure from the fluid in the sump flexes the diaphragm to close the electrical switch means and pressure from the pump discharge keeps the diaphragm flexed.

2. A switch of claim 1, wherein the valve means comprises a lower stationary section fixed in the inlet and having slots to permit flow of fluid, a vertically movable upper section, a bolt slidably connecting the upper section to the lower section, and a helical spring biasing the sections apart.

3. A switch of claim 1, wherein the diaphragm is disposed horizontally.

4. A switch of claim 1, wherein the electrical switch means has a push button adapted to be engaged by the diaphragm.

References Cited in the file of this patent

UNITED STATES PATENTS

| | | |
|---|---|---|
| 2,488,506 | Bernhardt | Nov. 15, 1949 |
| 2,635,546 | Enyeart et al. | Apr. 21, 1953 |
| 2,644,867 | Ruffle | July 7, 1953 |
| 2,804,516 | Staak | Aug. 27, 1957 |
| 2,962,566 | Lisac | Nov. 29, 1960 |
| 3,067,302 | Nielsen | Dec. 4, 1962 |
| 3,070,021 | Tutthill | Dec. 25, 1962 |